United States Patent [19]

Masser

[11] 4,405,154

[45] Sep. 20, 1983

[54] MULTI-AXLE EQUILIZED SUSPENSION SYSTEM

[75] Inventor: Lloyd D. Masser, Twin Lakes, Mich.

[73] Assignee: Lear Siegler, Inc., Santa Monica, Calif.

[21] Appl. No.: 263,981

[22] Filed: May 15, 1981

[51] Int. Cl.$^3$ .............................................. B60G 5/00
[52] U.S. Cl. .................................... 280/686; 267/52; 280/112 A
[58] Field of Search .................. 280/686, 112 A, 718, 280/687, 104, 676; 403/36; 267/52, 66, 11 R

[56] References Cited

U.S. PATENT DOCUMENTS

| | | | |
|---|---|---|---|
| 2,877,032 | 3/1959 | Fidler | 280/686 |
| 2,907,579 | 10/1959 | Masser | 280/686 |
| 3,003,782 | 10/1961 | Hickman | 280/686 |

Primary Examiner—Richard A. Bertsch
Attorney, Agent, or Firm—Varnum, Riddering, Wierengo & Christenson

[57] ABSTRACT

A suspension (10) for multi-wheeled vehicles includes a pair of outer equalizing beams (18) rockably supported by trunnion assemblies (22, 26) for deflection in response to changes in the terrain over which the vehicle travels. The equalizing beams (18) mount a pair of axles (16) supporting ground-engaging wheels. At least one inner equalizing beam (20) is mounted to a trunnion assembly (24) with the inner equalizing beam (20) providing a support for mounting of two leaf spring assemblies (28, 30) between the outer equalizing beams (18). In one embodiment, a four-axle suspension includes two leaf spring assemblies (28, 30) on each side of the vehicle. Each leaf spring assembly (28, 30) is secured between one of the outer equalizing beams (18) and the inner equalizing beam (20). The leaf spring assemblies (28, 30) include an axle connection (34) for supporting an axle (14) and a ground-engaging wheel. Load equalization is enhanced by radius rods (80, 100) which extend between one of the axles (14) and one of the trunnion tubes (46). The radius rods (80, 100) also tend to limit deflection between axles. In another embodiment, a five-axle suspension in accordance with the invention includes two inner equalizing beams (220) and three leaf spring assemblies (228–230) on each side of the vehicle so as to increase the vehicle capacity.

6 Claims, 6 Drawing Figures

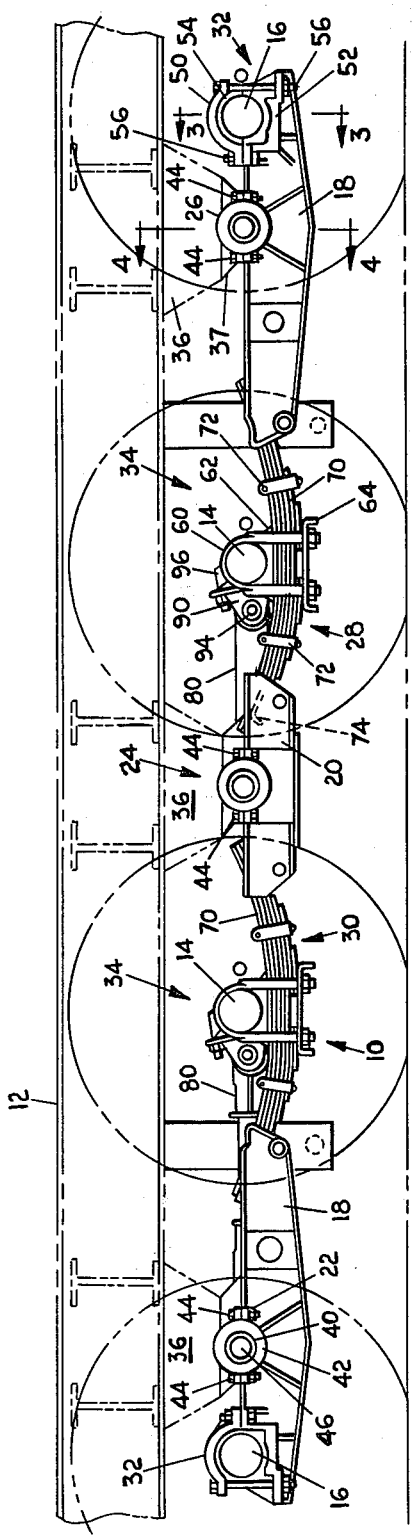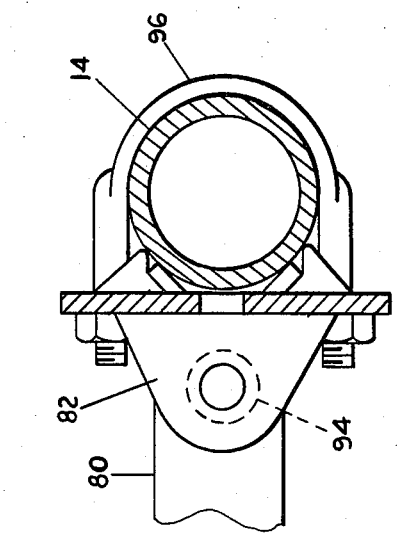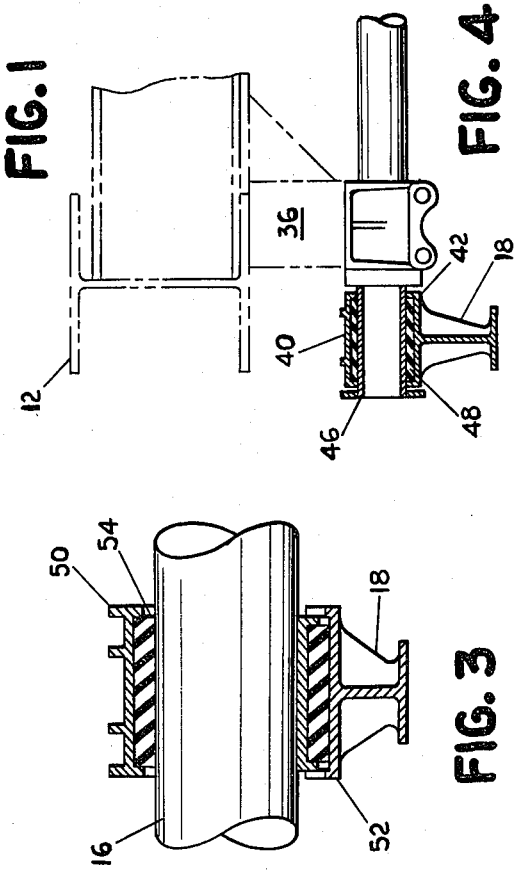

MULTI-AXLE EQUILIZED SUSPENSION SYSTEM

DESCRIPTION

TECHNICAL FIELD

The invention relates to a multi-axle vehicle suspension for a truck or trailer which provides for even distribution of the vehicle load across the axles.

BACKGROUND ART

In vehicle suspension systems for large trucks and trailers it is common to mount a number of axles to the trailer in order to support the vehicle load. One commonly employed suspension system includes three axles which are supported by a combination of leaf springs and fixed beams. In the prior known three axle suspension, two axles are mounted to equalizing beams which are rockable about a trunnion tube. The trunnion tube is in turn secured to the vehicle by a mounting bracket which is welded or bolted to the underside of the trailer or vehicle. The third axle of the suspension is supported by a leaf spring assembly which is suspended between the inner ends of the two equalizing beams. Such a three axle suspension is manufactured by the Neway Division of Lear Siegler, Inc., the Assignee of this application, as their TR-8750 suspension.

In order to provide a suspension which is capable of carrying a greater vehicle load than a three axle suspension, it has been known to mount a separate axle to a trailer already provided with a three axle suspension. In such an arrangement, the fourth axle is not interconnected with any of the remaining axles and thus no interdependent distribution of the load between the three axles and the fourth takes place. If the axles are subjected to an uneven load such as occurs when the vehicle travels over uneven terrain, one axle will be more greatly stressed than the others. Further, the fourth axle must be carefully adjusted so that it carries a load equal to the other three axles on even terrain. Other combinations of conventional axle assemblies may be used to mount four or more axles to a vehicle. For example, two two-axle, tandem assemblies may be mounted to a trailer to provide the desired load capacity. These combinations also require careful adjustments to equalize the load on all axles.

It is also known to separately mount four axles to a vehicle by the use of four separate leaf spring assemblies. Each leaf spring assembly is secured to the vehicle and carries an axle connection for mounting an axle to the vehicle. Each leaf spring assembly separately responds to the vehicle terrain and there is no interconnection between the leaf spring assemblies which would distribute the load equally over the axles. The independent operation of each assembly detracts from ride stability and does not add to the roll stability of the vehicle about its axis in the direction of travel. Roll stability of leaf spring suspensions is less than that for trailing arm suspensions. Also, each spring assembly has a plurality of moving parts all of which create friction when the springs deflect so as to detract from ride stability.

Thus, it can be seen that the prior known suspension assemblies which include four or more axles do not provide for interconnection between each axle which allows for even distribution of a load. Further, such prior known suspensions include a multiplicity of parts and are often constructed by assembling separate suspension systems having one or two axles, requiring careful adjustments.

DISCLOSURE OF THE INVENTION

In accordance with the invention, a suspension mounted to one side of a multi-wheeled vehicle includes a pair of outer equalizing beams which are supported on trunnion tubes and rockable thereabout so as to allow for deflection of the beam in response to the terrain over which the vehicle travels. The trunnion tubes are secured to a load supporting member of the vehicle by means of a bracket or the like. The equalizing beams mount a pair of axles at the outer ends thereof, wih each axle supporting a ground-engaging wheel. At least one inner equalizing beam is mounted to a trunnion tube which is also secured to the vehicle frame by a bracket or the like. The inner equalizing beam provides a support which allows for mounting of at least two leaf spring assemblies between the two outer equalizing beams. In a four axle suspension, the leaf spring assemblies are mounted so that one end of each leaf spring is secured to one of the outer equalizing beams while the other end thereof is mounted to the inner equalizing beam. Each of the leaf spring assemblies includes an axle connection for supporting an axle which in turn mounts a ground engaging wheel. In order to limit displacement between adjacent axles and assist in load distribution, radius rod means extend between at least one of the axles supported on the leaf spring assemblies and one of the trunnion tubes mounting the outer equalizing beams. The equalizing beams provide an interconnection between each axle so as to allow for equal load distribution amongst the axles. The above-described suspension is mounted on opposite sides of a vehicle so as to support the four axles.

The suspension system may include four axles, as described above, or five or more axles depending upon the load which the vehicle is to carry. In a five axle suspension, two inner equalizing beams are mounted to each side of the vehicle by trunnion tubes and a third leaf spring assembly which mounts an axle is suspended between the two inner equalizing beams.

The equalizing beams are mounted to the trunnion tubes by a bushed connection which dampens vibration of the tubes and equalizing beams. The radius rods are pivotably mounted between the axles and trunnion tubes and thus allow for a limited vertical angular deflection of one axle relative to the trunnion tube.

BRIEF DESCRIPTION OF THE DRAWINGS

The invention will be described with reference to the accompanying drawings wherein like members bear like reference numerals and in which:

FIG. 1 is a side elevational view of a four-axle suspension system according to the invention;

FIG. 3 is a sectional view taken along lines 3—3 of FIG. 1;

FIG. 4 is a sectional view taken along lines 4—4 of FIG. 1;

FIG. 5 is a sectional view taken along lines 5—5 of FIG. 2; and

BEST MODE FOR CARRYING OUT THE INVENTION

Figure 2:
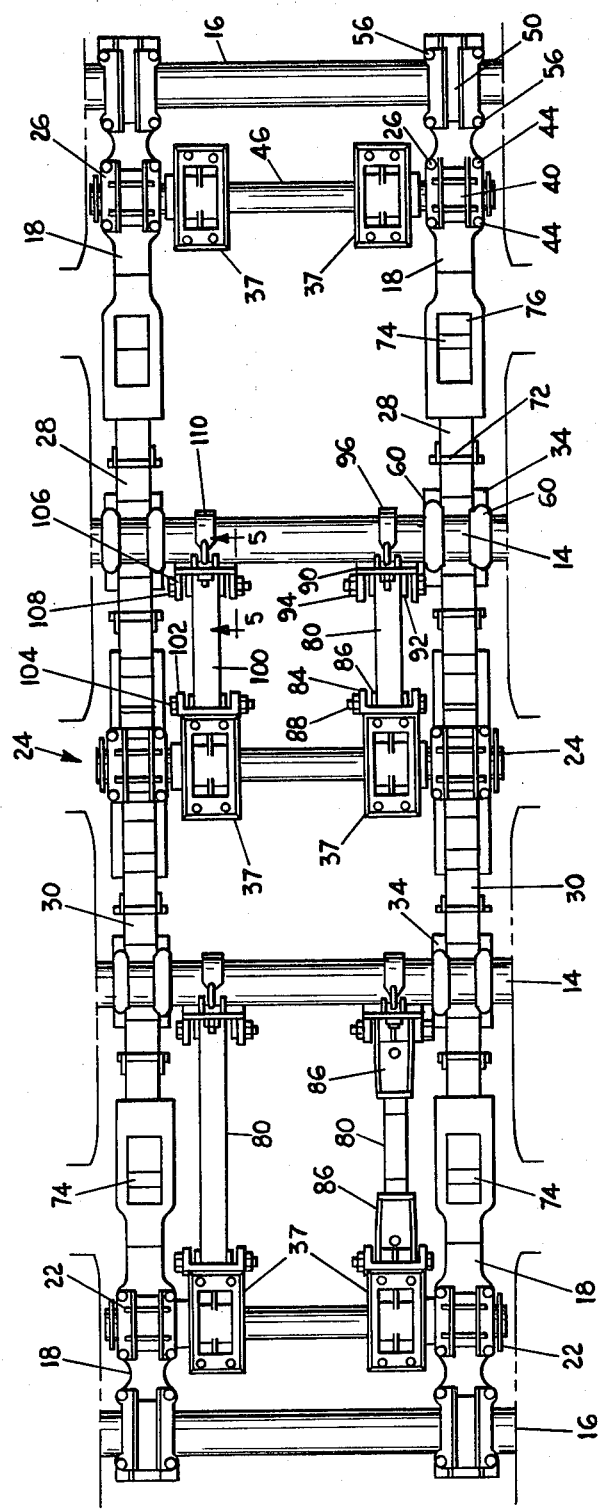
FIG. 2 is a plan view of a suspension system in FIG. 1.

With reference to FIG. 1, a suspension system 10 for trailers, tractors and the like is shown. Such a suspension system is used on each side of a trailer or tractor, as shown in FIG. 2.

The suspension system 10 is secured to a vehicle frame 12 as will be described below. The suspension system 10 couples four axles 14 and 16 to a vehicle frame 12 through load bearing trunnion assemblies 22 through 26. The two inner axles are designated as 14 while the outer axles are designated as 16. The axles 14 and 16 are mounted between suspension systems 10 secured to opposing sides of the vehicle.

The suspension system 10 includes two leaf spring assemblies 28 and 30 including a plurality of conventional spring leaves maintained in an operative relationship. Secured to the central portion of each leaf spring assembly 28, 30 are axle connections 34 which couple the innermost axles 14 to the leaf spring assemblies. The leaf spring assemblies 28 and 30 are suspended between a center equalizing beam 20 secured to the vehicle frame by a trunnion assembly 24 and outer equalizing beams 18 secured to the vehicle frame by trunnion assemblies 22 and 26. The center equalizing beam 20 is mounted by trunnion assembly 24 and is rockable thereabout. The outer equalizing beams 18 are mounted by trunnion assemblies 22 and 26 and are also rockable about the trunnions. Depending from the vehicle frame are frame brackets 36 which are welded at the bottom portion thereof to trunnion clamps 37 and at the top portion thereof to the underside of the trailer. The trunnion clamps 37 mount the trunnion assemblies 22-26 to the vehicle.

The trunnion assemblies 22-26 comprises a trunnion cap 40 and a trunnion seat 42 which may be integral with the equalizing beam 18, 20 (see FIG. 4). A trunnion tube 46 is seated between the cap 40 and the seat 42. The cap and seat 40, 42 are secured to each other by means of bolts 44. As shown in FIG. 4, a cylindrical rubber bushing 48 is disposed between the cap 40, the seat 42 and the axle 46 to dampen vibrations of the trunnion tube. All three of the trunnion tubes 46 are mounted by the above-described assembly. As shown in FIG. 1, the trunnion assemblies 22-26 are disposed at approximately the mid-point of the equalizing beams 18, 20 and the equalizing beams 18, 20 are rockable about the trunnion tubes.

The axle connections 32 for the outermost axles 16 are described with reference to FIGS. 1, 2 and 3. The axle 16 is seated between an axle cap 50 and an axle seat 52 which may be integral with the equalizing beam 18. An annular rubber bushing 54 is disposed between the axle and the cap and seat which are joined by bolts 56. The bushing 54 dampens vibration of the axles.

The axle connection 34 for the inner two axles 14 is described with reference to FIGS. 1 and 2. The axles 14 are suspended from the leaf spring assemblies 28 and 30 at the midpoints thereof. Each axle 14 is joined to the leaf spring assemblies 28 and 30 by means of a U-bolt 60 and a clamp plate 64. Disposed between the bottom portion of the axle 14 and the leaf spring assembly 28, 30 is an axle seat 62 which corresponds to the curvature of the axle 14.

The leaf spring assemblies 28 and 30 comprise a plurality of spring leaves 70 which are maintained in an operative relationship by brackets 72. The end portions of one of the leaves 70 in the assembly are hooked, designated as 74, so as to retain the leaf spring assembly within a recess 76 on the equalizing beams 18 and 20. The hooked portion 74 of the spring leaf 70 prevents the assembly 28, 30 from disengaging from the equalizing beam 18, 20.

Secured between the two inner axles 14 and the two outer trunnion tubes 46 in an adjustable radius rod 80. The adjustable radius rod 80 is disposed on one side of the center line of the vehicle. A fixed radius rod 100, to be described below, is mounted on the opposite side of the suspension center line. The fixed and adjustable radius rods 80, 100 allow for alignment of the axles and trunnion tubes. The radius rod 80 is pivotably mounted between the trunnion clamps 37 which support the trunnion tubes for the outer axles and a radius rod axle bracket 82 secured to the inner axles. Each end of the radius rod 80 includes an annular sleeve 86 threadably secured to the rod. The annular sleeves 86 receive a bolt or pin about which the rod rotates as shown in FIG. 2. End 86 of the radius rod 80 is pivotally mounted to a clevis 84 secured to the trunnion clamp 37 by means of a bolt 88. The opposite end 92 of the radius rod 80 is secured to the U-shaped radius rod axle bracket 82 by means of a bolt 94. The radius rod axle bracket 82 is welded to the axle 14 and further secured by means of a U-bolt 96 as shown in FIG. 5.

The fixed radius rods 100 are supported between the two inner axles 14 and the outer trunnion axles 22 and 26. Each radius rod 100 is pivotably mounted between the trunnion bracket 37 and an axle mounting bracket 106, as described above. The trunnion clamp 37 includes a clevis 102 which receives an end of the rod 100. The rod 100 is pivotally secured to the clevis 102 by a bolt 104. The other end of the rod 100 is received within an axle mounting bracket 106 which has a generally U-shaped configuration. The rod 100 is pivotally mounted thereto by a bolt 108. The axle mounting bracket 106 is welded to the axle and further supported by a U-bolt 110 in a manner similar to U-bolt 96 of the adjustable radius rod 80.

Figure 6:
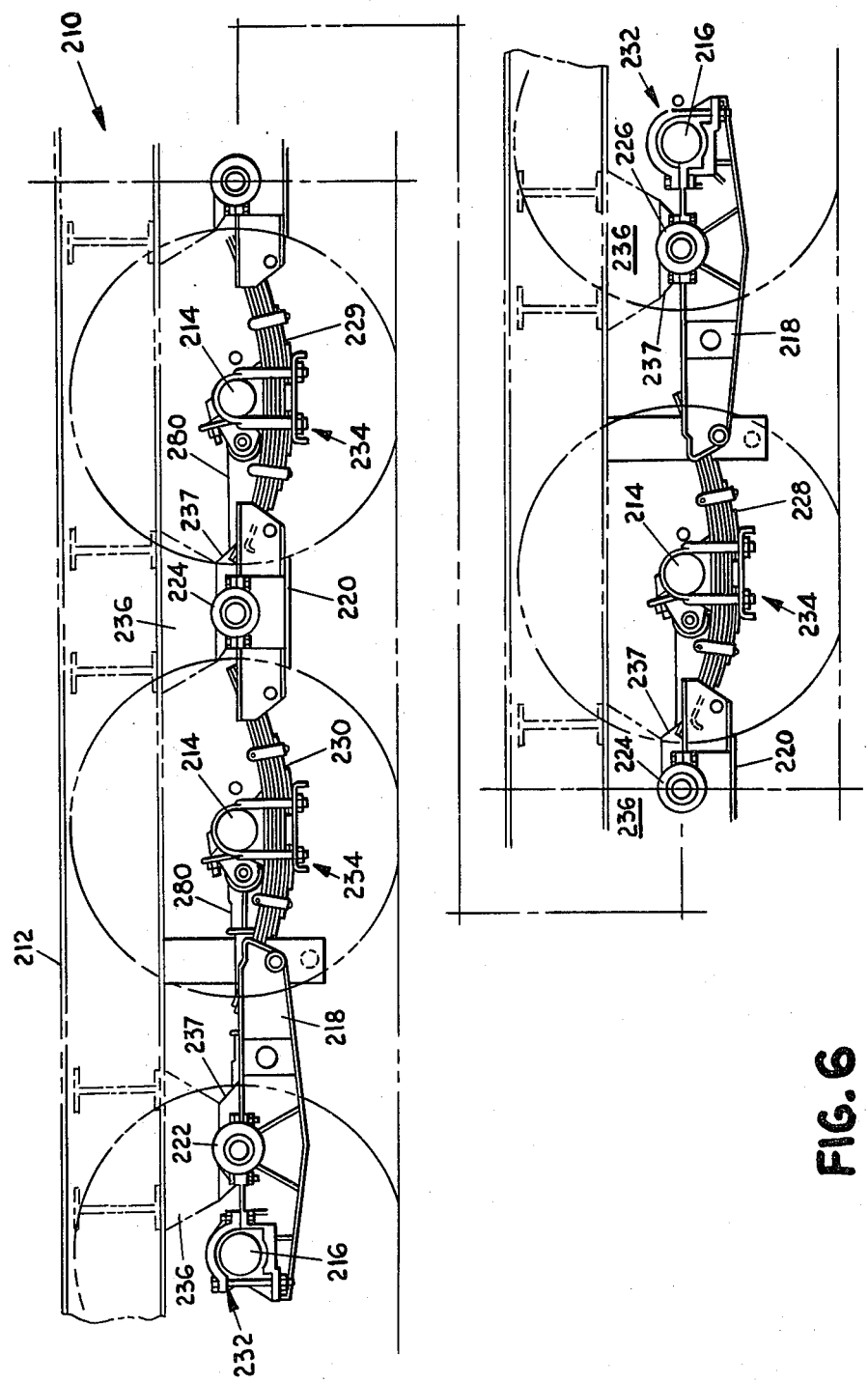
FIG. 6 is a side elevational view of a five-axle suspension according to the invention.

FIG. 6 shows a five axle suspension system 210 for trailers, tractors and the like which is similar to the four axle suspension described above. The parts of the five axle suspension are substantially identical to the four axle and 200 series numbering corresponding to FIGS. 1-5 will be used to describe the five axle suspension. The suspension 210 couples five axles to a vehicle load frame 212 through trunnion assemblies 222-226. The two outer axles of the suspension are designated as 216 whereas the three inner axles are designated as 214. The axles 214 and 216 are supported between identical suspension systems 210 mounted on opposite sides of the vehicle.

The five axle suspension 210 includes three leaf spring assemblies 228-230, each of which includes a plurality of conventional spring leaves maintained in an operative relationship. The inner axles 214 are mounted to the leaf springs by axle connections 234 which are identical to the axle connections 34 described above. The two leaf spring assemblies 228 and 230 are suspended between an outer equalizing beam 218 and an inner equalizing beam 220. The central leaf spring assembly 229 is suspended between inner equalizing beams 220. The manner in which the leaf spring assemblies are suspended is identical to that described above with reference to the four axle suspension. The inner equalizing beams 220 are secured to the vehicle frame by trunnion assemblies 224 and the outer equalizing beams are mounted on trunnion assemblies 222, 226. The trunnion assemblies are supported by trunnion clamps 237 which are welded between the underside of the trailer and frame brackets 236 which depend from the trailer. The equalizing beams are rockable about the trunnion assemblies as in the four axle suspension.

The trunnion assemblies 222-226 and the axle connections 232-234 for the inner and outer trunnions and axles are identical to the elements used in the four axle assembly and no further description will be included. Likewise the elements of the leaf spring assemblies 228-230 and the radius rods 280 are identical to those of the four axle suspension.

Both the four axle suspension shown in FIGS. 1-5 and the five axle suspension shown in FIG. 6 provide a vehicle suspension system for trucks and trailers wherein the load is equally distributed over all of the axles. In this regard, the equalizing beams transfer the load between axles in the event that one axle is subjected to a greater load than the remaining axles. This arrangement is distinct from prior known suspensions wherein each axle was separately suspended from a leaf spring or combinations of less than four axles were connected together. Such prior known suspensions do not provide for interdependent equalized distribution of the vehicle load and thus one axle may be more heavily stressed than the others, especially when the vehicle is travelling over uneven terrain. The particular number of axles is selected in view of the vehicle load. In the above-described four axle suspension system, a typical load is 25,000 pounds per axle. The five axle suspension shown in FIG. 6 allows for transporting of a larger vehicle load with load equalization amongst the axles. Such a five axle arrangement is different from prior known suspensions wherein a single axle would be added to a trailer, for example, which axle is not interconnected with the other axles of the vehicle.

The suspension systems as described above also have a fixed length in that the distance between the outer axles is fixed since the axles are secured to equalizing beams which do not experience any movement relative to the length of the trailer. Further, the length of the suspension is less than that required for independently mounted axle suspensions. Prior known suspensions have variable mounting lengths especially if leaf springs are used to mount each axle, since deflection of the springs would increase the overall length of the suspension. The rigid beam construction of the four and five axle suspensions described above provides roll stability about the longitudinal center of gravity of the vehicle. The fixed length also provides better roll stability in comparison to four axle assemblies where each axle is mounted on separate leaf spring assembly.

The above-described suspensions also have fewer friction parts in comparison to axle assemblies wherein each axle is suspended from a leaf spring. The friction between the moving parts reduces the ability of the suspension to respond to variations in the vehicle terrain and decreases the smoothness and stability of the ride. The four and five axle suspensions described above are also more economical and practical than prior known suspensions in that all the parts are interchangeable and there are relatively few parts in comparison to suspensions wherein each axle is separately mounted to the vehicle.

It is contemplated that more than five axles can be contained in a single interconnected suspension system by the addition of additional leaf spring and equalizing beam assemblies along with appropriate radius rods linking the axles and trunnion tubes. The interchangeability of the parts allows for the construction of such four, five or six axle suspensions without the need for manufacturing specialized parts.

The foregoing and description of drawings are merely illustrative of the invention and are not intended to limit the invention to the above-described embodiments. Variations and changes which may be obvious to one skilled in the art may be made without departing from the scope and spirit of the invention as defined in the appended claims.

The embodiments of the invention in which an exclusive property or privilege is claimed are defined as follows:

1. A suspension for a multi-wheeled vehicle comprising:
    a pair of outer equalizing beams each of which is mounted to a trunnion tube and rockable thereabout;
    means for securing said trunnion tubes to a load supporting member of said vehicle so as to mount said pair of outer equalizing beams to said vehicle;
    a pair of axles mounted to said pair of outer equalizing beams at the outer ends thereof, said axles supporting ground engaging wheels;
    at least one inner equalizing beam rockably mounted to a trunnion tube;
    means for securing said trunnion tube to said vehicle frame between said pair of outer equalizing beams;
    at least two leaf spring assemblies suspended between said pair of outer equalizing beams, each of said at least two leaf spring assemblies being secured between one of said pair of outer equalizing beams and an inner equalizing beam;
    each of said leaf spring assemblies mounting an axle supporting ground engaging wheels; and
    means for limiting relative axial displacement of at least one of said axles supported on said leaf spring assemblies relative to said outer axles;
    wherein said pair of outer equalizing beams and said at least one inner equalizing beam distribute the load of said vehicle equally over the axles.

2. The suspension of claim 1 including two inner equalizer beams and three leaf spring assemblies, wherein each of two of said leaf spring assemblies is secured between said outer equalizer beam and one of said two inner equalizing beam and the third of said leaf spring assemblies is secured between said two inner equalizing beams.

3. The suspension of claim 1 or 2 wherein said means for securing said trunnion tubes include at least one bracket which is secured to said load supporting member of said vehicle.

4. The suspension of claim 1 or 2 wherein each of said inner and outer equalizing beams are mounted to said trunnion tubes by bushed seats which dampen vibration of said equalizing beams.

5. The suspension of claim 1 or 2 wherein said means for limiting relative displacement includes at least one radius rod extending between one of said axles supported on the leaf spring assemblies and one of the trunnions on which said outer equalizing beams is mounted.

6. The suspension of claim 5 wherein said at least one radius rod includes a rod pivotably mounted between said axis and said one trunnion tube so as to provide for limited movement of said axle relative to said trunnion tube.

* * * * *